United States Patent [19]

Leitz et al.

[11] Patent Number: 5,084,524

[45] Date of Patent: Jan. 28, 1992

[54] BLOCK COPOLYMERS BASED ON CYCLIC ALIPHATIC CARBONATES AND/OR ESTERS ON THE ONE HAND AND CYCLIC AROMATIC CARBONATES ON THE OTHER HAND

[75] Inventors: Edgar Leitz, Dormagen; Karl-Heinz Ott, Leverkusen; Alfred Jung, Krefeld; Ulrich Grigo, Kempen; Hans-Josef Buysch; Norbert Schön, both of Krefeld, all of Fed. Rep. of Germany

[73] Assignee: Bayer Aktiengesellschaft, Leverkusen, Fed. Rep. of Germany

[21] Appl. No.: 407,166

[22] Filed: Sep. 14, 1989

[30] Foreign Application Priority Data

Sep. 20, 1988 [DE] Fed. Rep. of Germany ....... 3831887

[51] Int. Cl.$^5$ .................. C08G 64/18; C08G 64/12; C08G 63/08
[52] U.S. Cl. .................... 525/415; 525/411; 525/413; 525/461; 525/462; 528/196; 528/354; 528/358; 528/370; 528/371
[58] Field of Search ............... 525/411, 413, 415, 462, 525/461; 528/354, 358, 370, 371, 196

[56] References Cited

U.S. PATENT DOCUMENTS

| | | | |
|---|---|---|---|
| 3,155,683 | 11/1964 | Moody et al. | 260/340.2 |
| 3,274,214 | 9/1966 | Prochaska | 260/340.2 |
| 3,422,119 | 1/1969 | Prochaska | 260/340.2 |
| 3,641,200 | 2/1972 | Matzner | 525/413 |
| 4,281,101 | 7/1981 | Schreckenberg | 528/196 |
| 4,299,948 | 11/1981 | Weirauch et al. | 528/171 |
| 4,616,077 | 10/1986 | Silva | 528/371 |
| 4,644,053 | 2/1987 | Brunelle et al. | 528/371 |
| 4,699,974 | 10/1987 | Evans | 528/371 |
| 4,727,134 | 2/1988 | Brunelle et al. | 528/371 |
| 4,754,017 | 6/1988 | Leitz et al. | 528/371 |

FOREIGN PATENT DOCUMENTS 1229101 11/1966 Fed. Rep. of Germany .
3700193 7/1987 Fed. Rep. of Germany .

Primary Examiner—Melvyn I. Marquis
Assistant Examiner—David Buttner
Attorney, Agent, or Firm—Joseph C. Gil; Aron Preis

[57] ABSTRACT

Copolymers of blocks of polymers of cyclic aliphatic carbonates, cyclic aliphatic esters or cyclic aliphatic carbonates and cyclic aliphatic esters on the one hand and blocks of polymers of cyclic aromatic carbonates on the other hand and a process for their production by multistage polymerization, in which a block polymer is initially prepared from the aliphatic monomer and the aromatic polymer is produced in the presence of this block.

5 Claims, No Drawings

BLOCK COPOLYMERS BASED ON CYCLIC ALIPHATIC CARBONATES AND/OR ESTERS ON THE ONE HAND AND CYCLIC AROMATIC CARBONATES ON THE OTHER HAND

This invention relates to copolymers of blocks of polymers of cyclic aliphatic carbonates, cyclic aliphatic esters or cyclic aliphatic carbonates and cyclic aliphatic esters on the one hand and blocks of polymers of cyclic aromatic carbonates on the other hand. The block copolymers may be represented by the following idealized formula

A-C (I)

in which
A represents the aliphatic polymer block and
C represents the aromatic polymer block.
The block A is in particular
$A_1$ a polymer of one or more cyclic aliphatic carbonates,
$A_2$ a polymer of a cyclic aliphatic ester,
$A_3$ a block copolymer of blocks $A_1$ and $A_2$.
Structure of the blocks A:
The blocks $A_1$ are polymers of cyclic aliphatic carbonates corresponding to formula (III)

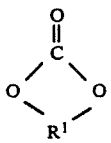

(III)

and/or to formula (IV)

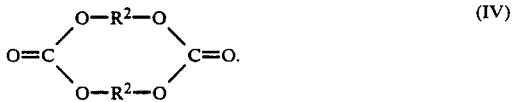

The blocks $A_2$ are polymers of cyclic aliphatic esters corresponding to formula (V)

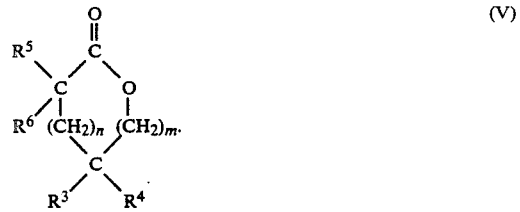

The blocks $A_3$ contain both compounds corresponding to formulae (III) and/or (IV) and those corresponding to formulae (V) in polymerized form.
Structure of the blocks C:
C in formula (I) is a polymer of cyclic aromatic carbonate oligomers corresponding to formula (VI)

In the formulae, the general symbols have the following meanings:
$R^1$ in formula (III)
a) $-CH_2CH_2CH(CH_3)-$
b) $-CH_2CH_2OCH_2CH_2OCH_2CH_2-$
c) $-CH_2CH(CH_3)CH_2CH_2C(CH_3)_2CH_2-$

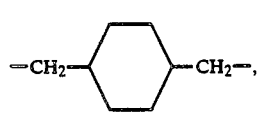

d)

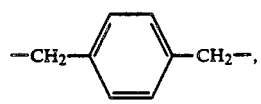

e)

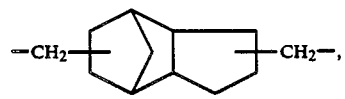

f)

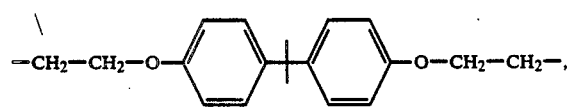

g)

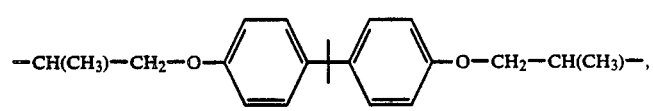

h)

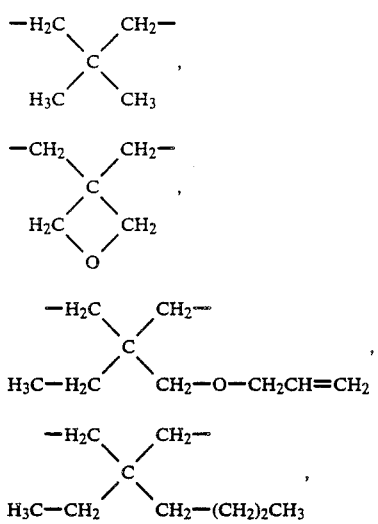

i)

j)

k)

l)

m) —(—CH$_2$—)—3 to 10,

R$^2$ in formula (IV)
a) —(—CH$_2$—)—4 to 12
b) CH$_2$CH$_2$OCH$_2$CH$_2$—
c) —CH$_2$CH$_2$OCH$_2$CH$_2$OCH$_2$CH$_2$—.

R$^3$, R$^4$, R$^5$ and R$^6$ in formula (V) independently of one another represent hydrogen, C$_{1-6}$ alkyl, C$_{3-6}$ alkylene, C$_{1-6}$ alkoxy and C$_{2-6}$ alkyleneoxy-C$_{1-6}$-alkyl (preferably hydrogen, CH$_3$, C$_2$H$_5$).

m and n in formula (V) independently of one another are 0 or an integer of from 1 to 6.

p in formula (VI) is an integer of from 1 to 30 (preferably from 1 to 20 and, more preferably, from 1 to 12).

R$^7$ is formula (VI) is a radical of a diphenyl corresponding to formula (VII)

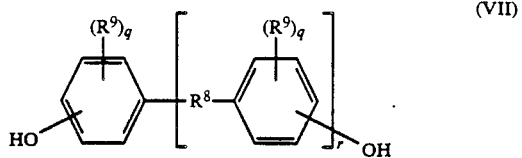

(VII)

R$^8$ in formula (VII) is a single bond, C$_{1-5}$ alkylene, C$_2$–C$_5$ alkylidene, C$_{5-6}$ cycloalkylidene, —O—, —SO—, —S—, —SO$_2$—, —CO— or

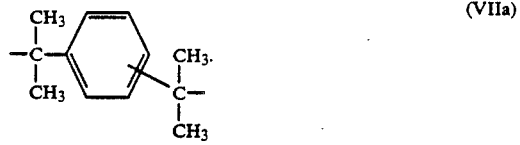

(VIIa)

R$^9$ in formula (VII) is chlorine, bromine or methyl.
q in formula (VII) is 0, 1 or 2.
r in formula (VII) is 1 or 0.

The compounds corresponding to formulae III to VI and their production are known.

Suitable diphenols corresponding to formula (VII) are hydroquinone, resorcinol, dihydroxyphenyls, bis-(hydroxyphenyl)-C$_1$-C$_5$-alkanes, bis-(hydroxyphenyl)-C$_1$-C$_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfides, bis-(hydroxyphenyl)-sulfones and α,α'-bis-(hydroxyphenyl)-diisopropylbenzenes and nucleus-chlorinated and nucleus-brominated or nucleus-methylated derivatives thereof.

Preferred diphenols corresponding to formula (VII) are 2,2-bis-(4-hydroxyphenyl)-propane, 2,2-bis-(3,5-dimethyl-4-hydroxyphenyl)-propane, 2,4-bis-(4-hydroxyphenyl)-2-methyl butane, 1,1-bis-(4-hydroxyphenyl)-cyclohexane, 4,4-dihydroxyphenyl sulfides, 4,4-dihydroxyphenyl sulfone and dibrominated and tetrabrominated or chlorinated derivatives, such as 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

The particularly preferred diphenol is 2,2-bis-(4-hydroxyphenyl)-propane.

Preferred cyclic aliphatic carbonates corresponding to formulae (III) and (IV) are trimethylene glycol carbonate, neopentyl glycol carbonate, butane-1,4-diol carbonate, the dimeric carbonate of pentanediol and the dimeric carbonate of hexanediol.

The particularly preferred cyclic aliphatic carbonate of formula (III) is neopentyl glycol carbonate.

Preferred cyclic aliphatic esters corresponding to formula (V) are pivalolactone and ε-caprolactone. ε-Caprolactone is particularly preferred.

The production of the cyclic aromatic carbonate oligomers corresponding to formula (VI) is described, for example, in EP-A 0 162 379, EP-A 0 224 131, DE-OS 2 937 332, DE-OS 3 717 626, U.S. Pat. Nos. 3,274,214, 3,422,119, 3,155,683, DE-AS 1 229 101.

The average molecular weights (weight average $\overline{M}_w$) of the blocks A and C in the idealized formula (I) may be the same or different. The average molecular weights $\overline{M}_w$ are in the range from 2,000 to 500,000 g/mol and preferably in the range from 5,000 to 250,000 g/mol for A and in the range from 2,000 to 500,000 g/mol and preferably in the range from 5,000 to 250,000 g/mol for C. (The blocks A may either be a polymer A$_1$ or a polymer A$_2$ or a combination of both polymers, i.e. a block copolymer A$_3$.

The polymers contain each of the blocks A and C in quantities of from 5 to 95% by weight (based on the total quantity of A+C) and preferably in quantities of from 10 to 90% by weight (based on the total quantity of A+C).

The block $A_3$ in the copolymer of formula (I) is a copolymer of a cyclic aliphatic carbonate corresponding to formula (III) and/or (IV) and a cyclic aliphatic ester corresponding to formula (V). This copolymer itself has a sequential structure with the following idealized formula:

$$(A_1\text{-}X\text{-}A_2)_y \qquad (VIII)$$

$A_1$ in formula (VIII) is a polymer of a cyclic aliphatic carbonate corresponding to formula (III) and/or (IV).

$A_2$ in formula (VIII) is a polymer of a cyclic aliphatic ester corresponding to formula (V).

y in formula (VIII) is an integer in the range from 1 to 10, preferably an integer in the range from 1 to 5 and, more preferably, has a value of 1.

X in formula (VIII) is a polymer containing both cyclic aliphatic carbonates (III) and/or (IV) and the cyclic aliphatic esters (V) in polymerized form, the concentration of the polymerized aliphatic carbonates (III) and/or (IV) decreasing continuously towards block $A_2$ and the concentration of the polymerized esters (V) decreasing continuously towards block $A_1$ (tapered structure).

The average molecular weights (weight averages $\overline{M}_w$) of the blocks $A_1$ and $A_2$ in the formula (VIII) may be the same or different. The average molecular weights $\overline{M}_w$ are in the range from 1,900 to 475,000 g/mol and preferably in the range from 4,500 to 225,000 g/mol for $A_1$ and in the range from 1,900 to 475,000 g/mol and preferably in the range from 4,500 to 225,000 g/mol for $A_2$.

The present invention also relates to a process for the production of block copolymers having the following idealized formula:

$$A\text{-}C \qquad (I)$$

in which, in a first step, a cyclic aliphatic carbonate corresponding to formula (III) and/or (IV) or a cyclic aliphatic ester corresponding to formula (V) or a cyclic aliphatic carbonate and a cyclic aliphatic ester are simultaneously polymerized with an alkyl alkali metal or aryl alkali metal compound in an aprotic organic solvent at temperatures in the range from +50° C. to −78° C. and preferably at temperatures in the range from +20° C. to −30° C. in a monomer-to-solvent ratio by weight of 5 to 35:100 and preferably 10 to 25:100, a solution of cyclic aromatic carbonate oligomers corresponding to formula (VI) in an aprotic organic solvent is added to the polymerization-active solution in a second step, the ratio by weight of oligomer to solvent being in the range from 5 to 35:100 and preferably in the range from 8 to 25:100, at −20° C. to +80° C. and preferably at 0° C. to +60° C., polymerization is continued and the polymerization-active centers are then deactivated.

The first step of the polymerization process is known per se. (cf. DE-OS 3 607 625).

Examples of the production of the block copolymers $A_3$ are described in the following:

1. To synthesize a block $A_3$ having the structure $(A_1\text{-}X\text{-}A_2)_y$, a mixture of a cyclic aliphatic carbonate corresponding to formula (III) and/or (IV) and a cyclic aliphatic ester corresponding to formula (V) is polymerized with alkyl alkali metal or aryl alkali metal compounds in an aprotic organic solvent, the block $A_1$ being synthesized first, followed by the "tapered" transition segment X and then by the block $A_2$. The polymer has the structure $(A_1\text{-}X\text{-}A_2)$ and is polymerization-active. (The subsequent addition of a solution of cyclic aromatic carbonate oligomers (IV) results in the synthesis of the block C, i.e. a copolymer having the idealized structure $(A_1\text{-}X\text{-}A_2)\text{-}C$ is obtained.)

2. Where a copolymer having the structure $A_1\text{-}X\text{-}A_2\text{-}A_1\text{-}X\text{-}A_2$ is required, another mixture of a cyclic aliphatic carbonate corresponding to formula (III) and/or (IV) and a cyclic aliphatic ester in an aprotic organic solvent is added to a polymerization-active solution of the copolymer $(A_1\text{-}X\text{-}A_2)$ and polymerized. The block B now has the structure $A_1\text{-}X\text{-}A_2\text{-}A_1\text{-}X\text{-}A_2$ and continues to be polymerization-active. (The subsequent addition of a solution of cyclic aromatic carbonate oligomers (IV) results in synthesis of the block C, i.e. a copolymer having the idealized structure $A_1\text{-}X\text{-}A_2\text{-}A_1\text{-}X\text{-}A_2\text{-}C$ is obtained.)

Blocks $(A_1\text{-}X\text{-}A_2)$ with $y > 2$ may be correspondingly synthesized.

The copolymerization of cyclic aliphatic carbonates and esters for the synthesis of the block $A_3$ in formula (I) takes place at temperatures in the range from +50° C. to −78° C. and preferably at temperatures in the range from +20° C. to −30° C. The ratio by weight of monomer to solvent is in the range from 5 to 35:100 and preferably in the range from 10 to 25:100. The subsequent polymerization of the cyclic aromatic carbonate oligomers is carried out at −20° to +80° C. and preferably at 0° to +60° C. The ratio by weight of oligomer to solvent is in the range from 5 to 35:100 and preferably in the range from 8 to 25:100. On completion of polymerization, the polymerization-active centers are deactivated.

The first step of the polymerization process for the synthesis of copolymers of the type $A_3$ is also known in principle (cf. DE-OS 3 700 193).

The copolymerization of cyclic aliphatic carbonates corresponding to formulae (III) and/or (IV) and/or cyclic aliphatic esters corresponding to formula (V) with cyclic aromatic carbonate oligomers corresponding to formula (VI) is carried out as "living" anionic polymerization in the presence of aprotic organic solvents using organic alkali metal compounds as initiators and in an inert atmosphere (absence of air and moisture).

Initiators are aryl alkali metal and alkyl alkali metal compounds and also alcoholates of the alkali metals. Preferred initiators are n-butyl lithium, s-butyl lithium, naphthalene potassium, naphthalene sodium, potassium phenolate, potassium tert.-butylate. Particularly preferred initiators are n-butyl lithium and s-butyl lithium.

The aprotic organic solvents used include cyclic ethers or aromatic or aliphatic hydrocarbons or mixtures of cyclic ethers and aromatic or aliphatic hydrocarbons. Preferred solvents are tetrahydrofuran, tetrahydropyran, dioxane and toluene.

Tetrahydrofuran and mixtures of tetrahydrofuran and toluene are particularly preferred.

On completion of polymerization, the polymerization-active centers are deactivated. The deactivators used are protic compounds, such as for example water, alcohols, acids or mixtures thereof. Preferred deactivators are mixtures of methanol/hydrochloric acid and methanol/phosphoric acid.

The copolymers may be isolated by known methods, for example by precipitation with alcohols, filtration and subsequent drying or by direct evaporation of the copolymer solution in evaporation units, such as screw extruders or thin-layer evaporators.

The copolymers may be stabilized, pigmented and antistatically finished and/or flameproofed or filled in known manner.

The processing of the copolymers is governed by their properties. Thus, moldings can be produced, for example, from thermoplastic copolymers by known methods for processing thermoplastics.

Depending on their chemical composition, the copolymers may be used for the production of films, seals, coatings or thermoplastic packs.

EXAMPLES

1. Production of the cyclic bisphenol A carbonate oligomers 2.4 g (0.0024 mol) triethylamine, 600 ml methylene chloride, 1800 ml water and 36 ml 45% sodium hydroxide (0.6 mol) are introduced under nitrogen into a reactor. A solution of 9.72 g (0.096 mol) triethylamine in 600 ml methylene chloride and a solution of 84.8 g (0.24 mol) bisphenol A bis-chlorocarbonic acid ester in 1200 ml methylene chloride are then simultaneously added dropwise with slow stirring (149 r.p.m.) over a period of 1 hour at room temperature. After stirring for 10 minutes, the reaction mixture was hydrolyzed with 3.6% hydrochloric acid, followed by phase separation. The aqueous phase was washed with methylene chloride. The organic phases were combined, washed with water and the crude product isolated by evaporation of the solvent (yield: 58.8 g (90%)).

The pure cyclic bisphenol A carbonate oligomers were recovered by extraction of the crude product with acetone (yield: 23.5 g (40%), based on crude product).

Analysis by HPLC revealed the following cycle distribution:

| Number of bisphenol A carbonate units in the cyclus | Quantity (weight %) |
| --- | --- |
| 2 | 5 |
| 3 | 25 |
| 4 | 19 |
| 5 | 15 |
| 6 | 10 |
| 7 | 8 |
| 8 | 6 |
| 9 | 4 |
| >9 | 8 |

Relative viscosity: 1.04 ($CH_2Cl_2$, 20° C., 2% by weight solution)

2. Production of a block copolymer of polyneopentyl glycol carbonate and bisphenol A polycarbonate in tetrahydrofuran 0.5 ml sec.-butyl lithium (1.3-molar solution in cyclohexane) was added under nitrogen with stirring at 15° C. to a solution of 5 g neopentyl glycol carbonate in 35 ml tetrahydrofuran. After a reaction time of 120 minutes at that temperature, 8 ml solution were removed and the polymer precipitated in 50 ml methanol/1-molar phosphoric acid (99:1). The polymer was isolated and dried.

Yield: 1.1 g

Relative viscosity ($\eta_{rel}$): 1.25 ($CH_2Cl_2$, 20° C., 2% by weight solution).

GPC analysis (calibration for polyneopentyl glycol carbonate):

Molecular weight (as determined at the maximum of the elution peaks): 18,000 g/mol.

After the sample had been taken, a solution of 5 g cyclic bisphenol A carbonate oligomer in 30 ml tetrahydrofuran was added to the reaction mixture. The reaction time was 90 minutes at 15° C. The reaction mixture was then poured into 400 ml methanol/1-molar phosphoric acid (99:1). The copolymer was isolated, washed with methanol until neutral and dried.

Yield: 8.4 g.

Relative viscosity ($\eta_{rel}$): 1.48 ($CH_2Cl_2$, 20° C., 2% by weight solution).

GPC analysis (calibration for polyneopentyl glycol carbonate):

Molecular weight (as determined at the maximum of the elution peak): 34,000 g/mol.

DSC analysis (2nd heating at 20° C./min.):

Melting temperature $T_m = 106°$ C.

Glass temperature $T_g = 131°$ C.

3. Production of a block copolymer of polyneopentyl glycol carbonate and bisphenol A polycarbonate in toluene/tetrahydrofuran 0.4 ml sec.-butyl lithium (1.3-molar solution in cyclohexane) was added under nitrogen with stirring at 15° C. to a solution of 10 g neopentyl glycol carbonate in 70 ml toluene. After a reaction time of 60 minutes at that temperature, the reaction mixture was added to a solution of 10 g cyclic bisphenol A carbonate oligomer in 75 ml tetrahydrofuran. The reaction time was 120 minutes at 15° C. The reaction mixture was then poured into 400 ml methanol/1-molar phosphoric acid (99:1). The copolymer was isolated, washed with methanol until neutral and dried.

Yield: 15.5 g.

Relative viscosity ($\eta_{rel}$): 1.60 ($CH_2Cl_2$, 20° C., 2% by weight solution).

4. Production of a block copolymer of poly-ε-caprolactone and bisphenol A polycarbonate in tetrahydrofuran 0.5 ml sec.-butyl lithium (1.3-molar solution in cyclohexane) was added with stirring under nitrogen at 15° C. to a solution of 5 g ε-caprolactone in 35 ml tetrahydrofuran. After a reaction time of 120 minutes at that temperature, 10 ml solution were removed and the polymer was precipitated in 50 ml methanol/1-molar phosphoric acid (99:1). The polymer was isolated and dried.

Yield: 1.3 g.

Relative viscosity ($\eta_{rel}$): 1.39 ($CH_2Cl_2$, 20° C., 2% by weight solution).

GPC analysis (calibration for poly-ε-caprolactone):

Molecular weight (as determined at the maximum of the elution peak): 15,000 g/mol.

After the sample had been taken, a solution of 5 g cyclic bisphenol A carbonate oligomers in 30 ml tetrahydrofuran was added to the reaction mixture. The reaction time was 90 minutes at 15° C. The reaction mixture was then poured into 400 ml methanol/1-molar phosphoric acid (99:1). The copolymer was isolated, washed with methanol until neutral and dried.

Yield: 7.9 g.

Relative viscosity ($\eta_{rel}$): 1.65 ($CH_2Cl_2$, 20° C., 2% by weight solution).

GPC analysis (calibration for poly-ε-caprolactone):

Molecular weight (as determined at the maximum of the elution peak): 29,000 g/mol.

DSC analysis (2nd heating at 20° C./minute):

Melting point $T_m = 50°$ C.
Glass temperature $T_{g1} = -60°$ C., $T_{g2} = 86°$ C.

5. Production of a block copolymer of poly-ε-caprolactone and bisphenol A polycarbonate in toluene/tetrahydrofuran 0.5 ml sec.-butyl lithium (1.3-molar solution in cyclohexane) was added under nitrogen with stirring at 15° C. to a solution of 10 g ε-caprolactone in 70 ml toluene. After a reaction time of 60 minutes at that temperature, the reaction mixture was added to a solution of 10 g cyclic bisphenol A carbonate oligomer in 75 ml tetrahydrofuran. The reaction time was 120 minutes at 15° C. The reaction mixture was then poured into 400 ml methanol/1-molar phosphoric acid (99:1). The copolymer was isolated, washed with methanol until neutral and dried.

Yield: 18.5 g.

Relative viscosity ($\eta_{rel}$): 1.43 ($CH_2Cl_2$, 20° C., 2% by weight solution).

6. Production of a block copolymer of poly(neopentyl glycol carbonate-tap-ε-caprolactone) and bisphenol A polycarbonate in tetrahydrofuran 0.5 ml sec.-butyl lithium (1.3-molar solution in cyclohexane) was added with stirring under nitrogen at 15° C. to a solution of 2.5 g neopentyl glycol carbonate and 2.5 g ε-caprolactone in 35 ml tetrahydrofuran. After a reaction time of 60 minutes at that temperature, 10 ml solution were removed and the polymer was precipitated in 50 ml methanol/1-molar phosphoric acid (99:1). The polymer was isolated and dried.

Yield: 1.3 g.

Relative viscosity ($\eta_{rel}$): 1.52 ($CH_2Cl_2$, 20° C., 2% by weight solution).

After the sample had been taken, a solution of 5 g cyclic bisphenol A carbonate oligomers in 35 ml tetrahydrofuran was added to the reaction mixture. The reaction time was 150 minutes at 15° C.

The reaction mixture was then poured into 400 ml methanol/1-molar phoshoric acid. The copolymer was isolated, washed with methanol until neutral and dried.

Yield: 8.45 g.

Relative viscosity ($\eta_{rel}$): 1.62 ($CH_2Cl_2$, 20° C., 2% by weight solution).

DSC analysis (2nd heating at 20° C./min.):

Glass temperatures $T_{g1} = -24°$ C., $T_{g2} = 97°$ C.

7. Production of a block copolymer of poly(neopentyl glycol carbonate-tap-ε-caprolactone and bisphenol A polycarbonate in toluene-tetrahydrofuran 0.5 ml sec.-butyl lithium (1.3-molar solution in cyclohexane) was added under nitrogen with stirring at 15° C. to a solution of 5 g ε-caprolactone and 5 g neopentyl glycol carbonate in 70 ml toluene. After a reaction time of 60 minutes at that temperature, the reaction mixture was added to a solution of 10 g cyclic bisphenol A carbonate oligomer in 75 ml tetrahydrofuran. The reaction time was 120 minutes at 15° C. The reaction mixture was then poured into 400 ml methanol/1-molar phosphoric acid (99:1). The copolymer was isolated, washed with methanol until neutral and dried.

Yield: 16.1 g.

Relative viscosity ($\eta_{rel}$): 1.44 ($CH_2Cl_2$, 20° C., 2% by weight solution).

We claim:

1. Copolymers of (i) a mixture of blocks of cyclic aliphatic carbonates and blocks of cyclic aliphatic esters and (ii) blocks of polymers of cyclic aromatic carbonates.

2. Block copolymers containing a polymer of a mixture of blocks of neopentyl glycol carbonate and blocks of ε-caprolactone ester synthesized in block form and a block of the polymer of cyclic bisphenol A carbonate oligomers.

3. A process for the production of copolymers of blocks of polymers of (i) cyclic aliphatic carbonates or (ii) a mixture of blocks of cyclic aliphatic carbonates and blocks or cyclic aliphatic esters and (iii) blocks of polymers of cyclic aromatic carbonates characterized in that, in a first step a cyclic aliphatic carbonate or a mixture of cyclic aliphatic carbonate and a cyclic aliphatic ester is polymerized with an alkyl alkali metal compound in an aprotic organic solvent at a temperature of about 50° C. to 78° C., a solution of cyclic aromatic carbonate oligomers in an aprotic organic solvent is added to the polymerization-active solution in a second step, polymerization is continued at a temperature of $-20°$ C. to $+60°$ C. and the polymerization-active centers are then deactivated.

4. A process for the production of copolymers of blocks of polymers of (i) a mixture of blocks of cyclic aliphatic carbonates and blocks of cyclic aliphatic esters and (ii) blocks of polymers of cyclic aromatic carbonates characterized in that, in a first step a cyclic aliphatic carbonate or a mixture of a cyclic aliphatic carbonate and a cyclic aliphatic ester is polymerized with an alkyl alkali metal compound in an aprotic organic solvent at a temperature of about 50° C. to 78° C., a solution of cyclic aromatic carbonate oligomers in an aprotic organic solvent is added to the polymerization-active solution in a second step, polymerization is continued at a temperature of $-20°$ C. to $+60°$ C. and the polymerization-active centers are then deactivated.

5. The copolymer produced in accordance with the process of claim 4.

* * * * *